Patented Dec. 11, 1951

2,578,186

UNITED STATES PATENT OFFICE 2,578,186

BACTERIA-RESISTANT ELASTOMERS CONTAINING SILVERED ANION-EXCHANGE RESINS

Garnet Philip Ham, Stamford, Conn., assignor to American Cyanamid Company, New York, N. Y., a corporation of Maine No Drawing. Application June 16, 1950,
Serial No. 168,660

6 Claims. (Cl. 260—3)

This invention relates to elastomers having enhanced resistance to bacteria. More particularly, this invention relates to elastomers having enhanced resistance to bacteria, which contain an anion exchange resin upon which silver has been precipitated.

It has long been known that certain hydrocarbons, such as crude petroleum oils and hydrocarbon elastomers, such as vulcanized natural rubber, highly purified (non-vulcanized) caoutchouc, Buna S, GR-S rubber, and butadiene-styrene copolymers in general, act as acceptors for bacterial growth. For example, bacteria of the Actinomyces and Proactinomyces genera are outstanding.

The best natural environment leading to the bacterial deterioration of these elastomers is found in tropical climates where temperature, humidity, and bacterial concentration are all high. Bacterial attack, however, also occurs in temperate zones. The growth of bacteria upon latex, and compounded rubber stoppers, tubing, and sheeting has been noted in the literature.

In recent years, numerous attempts have been made to produce non-toxic, rugged, durable, and highly bacteria-resistant elastomers by the use of certain classes of germicides. These attempts were not completely successful. For example, organic germicides, such as mercaptobenzothiazole and tetramethylthiuram disulfide, were investigated, but when these materials were incorporated in bacteriostatically effective amounts they tended to alter disadvantageously the physical properties of the vulcanized elastomer. In other instances the organic germicides were destroyed upon vulcanization of the elastomer mix, as a result of thermal decomposition of the germicide itself, or as the result of reaction of the germicide with the elastomer or with one or more of the chemically active constituents of the mix. In addition, organic germicides are usually leached progressively from the surface of the elastomer upon contact with water or with the organic liquids to which rubber is exposed in ordinary military use.

The mercuri-organic germicides proved unsuitable because of their high cost and toxicity to the ultimate user.

The wholly inorganic germicides were ineffective because they were leached from the surface of the rubber faster than fresh rubber surfaces were exposed as the result of normal wear. Thus the weathering surface of the rubber was usually in a quite unprotected condition, in the same manner as when soluble organic germicides were used.

The deterioration of ordinary elastomeric articles, such as vehicle tires, rubber insulation, and water hose, as a result of bacterial attack is a costly process the effects of which can be combatted only by replacing the article itself.

As a result, a demand has arisen for a strong, non-tacky, rubber-like elastomer containing an odorless, tasteless, non-toxic, insoluble, thermally stable, bacteriostatic agent which is fully compatible with the elastomer and which is not wetted thereby. A further demand has arisen for a bactericidal rubber-like elastomer containing this agent having the property of acting in a germicidal manner to solutions with which it comes into contact. An additional demand has arisen for a rubbery silver-containing bacteria-resistant elastomer containing a minimum amount of silver capable of oligodynamic action.

In the past, it has been proposed to incorporate silver-containing resins in rubber. When this was attempted, weak, tacky, and scorched products were obtained which departed entirely from the product sought. While exhibiting some bacteriostatic activity, the resins were preponderantly wetted by the rubber, and the products could not be used for tire tread and similar applications.

The surprising discovery has now been made that a rugged bacteria-resistant elastomer, fulfilling the above-noted requirements, can be prepared by incorporating into the compounding mix, at any point prior to the vulcanization step, a critical percentage of a composite, anion-active resin which contains a critical percentage of oligodynamic silver, which resin has been ground to a critical particle distribution size.

The further very surprising discovery has been made that when the above-described silvered resin particles are incorporated into the elastomer, as described, the silvered resin particles are not "wet" or occluded by the surrounding rubber body even though the particles are as small as about 325 mesh, and that the particles release silver ions freely when contacted with aqueous media. The resin particles remain as entities embedded in, but not covered by the ruber matrix, so that their power to adsorb or detain bacteria and to produce small amounts of oligodynamic silver in a liquid medium is not greatly diminished by the presence of the surrounding rubber.

As a result of these discoveries it has been found that the percentage of oligodynamic silver necessary to impart bacteriostatic or bactericidal properties to an elastomer may be drastically reduced without correspondingly reducing the bacteriostatic or bactericidal properties of the elastomers. It has been found that resins containing as little as 0.5%–1.5% silver are fully useful for this purpose.

According to the present invention an insoluble thermostable anion exchange resin (approximately 40–60 mesh) is activated by treatment with an alkaline solution according to conventional practice, and a critical proportion of silver, viz., between about 0.5% and 2.5% of the weight of the resin, is adsorbed thereon.

The anion active resins which may be employed in this invention should be of ordinary insolubility and be sufficiently thermostable to withstand ordinary vulcanization. Present-day commercial anion active resins possess these characteristics, as is well-known in the art, and urea-guanidine-formaldehyde resins and guanidine-triazine-formaldehyde resins are particularly suitable.

The adsorption of silver may be performed in any conventional manner but is preferably done by passing the calculated amount of a dilute solution of a soluble silver salt such as silver nitrate through the resin in the substantial absence of light. This proportion of silver is far below the adsorptive capacity of anion-exchange resins. If the upper proportion is substantially exceeded, vulcanization failures may occur, the resin may be "wetter" by the rubber, or be otherwise inactivated. Other undesirable consequences may follow.

The thus prepared silvered resin may be ground to 200–325 mesh and used as such. If desired, however, the adsorbed silver may be reduced to metallic silver by conventional means, for example, by slurrying the resin in a dilute solution of potassium metabisulfite which is made slightly acid. Formation of free silver occurs as the slurry is slowly warmed to 50° C. After the reduction, the resin is ground as above. Other reductants also may be used to produce satisfactory results.

It is a surprising advantage of the present invention that the above-described reduction need not be performed, and that the resin after termination of the silver nitrate treatment, is preferably ground and used directly, as stated.

The silvered resins vary in color from a light yellow to a brownish black, depending on the amount of silver adsorbed. But in any instance an insufficient proportion of resin is incorporated to affect the color of the elastomer materially.

It is a further particular advantage of the present invention that the elastomer formulations containing the silvered resin may be compounded according to ordinary practice so that a rubber industry need not learn any new techniques. The silvered resin is merely added at any appropriate point and is thoroughly milled until the elastomeric composition is homogeneous.

The proportion of resin which may be thus compounded, however, is very critical. The resin has a pronounced surface activity, and when a larger proportion of the resin than that specified above is used, disadvantageous reactions with some or all of the constituents of the elastomeric composition may take place resulting in, for example, scorching, tackiness, and a decrease in the pliability and elasticity of the product. None of these undesirable features occurs when the resin is present only to an extent between 2% and 6% by weight based on the total weight of the elastomeric composition used. With the resin used in this range of concentration, the silver content is about 4/10,000 of the whole, and it is surprising that such a small amount of silver, only a minute fraction of which is present at the surface of the elastomer, is capable of exerting its pronounced bactericidal effect.

Ordinary anion active resins have a high capacity for soluble inorganic silver salts, and numerous members of this group of resins can adsorb 15%–20% of their weight of these materials. It has been found that it is quite unnecessary to exhaust the capacity of these resins with silver salts, and that bacteriostatic elastomers of excellent physical properties result when much less than 10% of the above proportion of silver is present in the resin.

It is well-known that all bacteria are electrically charged, and that they behave as electrically charged colloids. Nearly all bacteria, including *Staphylococcus aureus*, are negatively charged. A few, such as *B. subtilis*, carry positive charges. It is surprising, therefore, that the effectiveness of the elastomers of the instant invention does not appear to be influenced by the type of charges carried by the bacteria to which the elastomers are exposed.

The vulcanized, silver resin-containing elastomers of the present invention possess the following characteristics. First, they are pliable and their degree of elasticity has not been significantly diminished. Their normal color has not been noticeably altered. Their surfaces (either as molded or after cutting) are substantially the same as that of the corresponding elastomer which is free from the resin. The surfaces, whether vulcanized or cut, contain particles of the silver resin which are not occluded by a film of rubber. In addition to this, the compositions are not toxic. They produce silver ions when in intimate contact with aqueous media.

The following examples, in which the proportions are in parts by weight except where otherwise stated, are given by way of illustration and not in limitation of the instant invention.

Example 1

The guanidine nitrate-urea-formaldehyde resin of Example 7 of U. S. Patent 2,434,190 was activated with sodium carbonate in a column, and a dilute solution of silver nitrate passed through until about 1% of silver (as metallic silver) had been absorbed, based on the weight of resin. The resin was dried, ground to 200–325 mesh and compounded as follows on a rubber mill.

|  | Parts by weight |
|---|---|
| Natural rubber | 100 |
| Zinc oxide | 10 |
| Stearic acid | 2 |
| Sulfur | ¾ |
| Monex (tetramethylthiuram monosulfide) | 0.1 |
| Accelerator 808 (a butyraldehydeaniline condensation product) | ¾ |
| Silvered anion-active resin | 3 |

The mix was cured for five minutes at 155° C.

Example 2

Example 1 is repeated, the cure being conducted at 141° C. for 15 minutes.

Example 3

Example 1 is repeated using Buna S synthetic rubber in place of the natural rubber.

Example 4

Example 2 is repeated using Buna S in place of the natural rubber.

The elastomers produced by Examples 1–4 are similar in all ordinary respects to the same products prepared without the use of the silvered resin, and are pliable and free from undue odor, tackiness, and evidence of scorching.

Example 5

Five agar plates richly inoculated with *Staphylococcus aureus* are allowed to harden under aseptic conditions. One piece of the new rubber compounds of Examples 1–4, about ½″ x ¼″ is placed on the surface of each of four of these plates in the center. A piece of rubber of the same formulation but with the silver resin omitted is placed in the fifth plate which acts as a control.

The rubber compounds are used without prior sterilization but are wet with water. The plates are then covered and are incubated at 37° C.

Rapid bacterial growth takes place around the rubber which contains no silver resin.

After 18 hours a distinct and clear zone of inhibition develops about each of the four rubber pieces which contain silver resin, while in the background the organisms are growing freely and the plate in that area has an opaque appearance. The clear zone persists for at least five days.

This zone of inhibition demonstrates that a bacteriostatic effect has occurred. In order to further prove the efficiency of the rubber pieces, portions of each of these clear zones are extracted at times ranging from 18 hours to 5 days, and replated into fresh nutrient broth or agar plates at 37° C. No new growth occurs in this replating, and therefore the action of the rubbers is bactericidal with respect to the bacteria employed.

Example 6

Example 5 is repeated using, however, *Escherichia coli*. No growth is experienced in five days in the zones around the samples of rubber which contained silver resin, with immediate growth about the resin-free rubber. On replating, as above, growth develops.

With this organism, therefore, the effect of the rubber samples is bacteriostatic.

Example 7

Example 6 is repeated using, however, *B. subtilis*. A similar growth immediately surrounds the resin free rubber. No growth is experienced in 5 days in the zones around the other samples, and no growth is obtained when a replating test is made according to Example 5.

With this organism, the effect is bactericidal.

Example 8

Samples of the four silver-containing cured rubbers of Examples 1–4 are shaken in an ordinary soap solution at 20° C. for 30 minutes, water washed to remove any alkaline material as far as possible, and Example 5 is repeated using, however, the thus washed rubbers. The same bactericidal action takes place.

Example 9

Example 8 is repeated using, however, samples which have been shaken in gasoline at 20° C. for five minutes and thoroughly dried before testing.

The same bactericidal action takes place.

Example 10

Example 5 is repeated in which, however, all of the sides of the silver-containing elastomers have been removed by a sharp knife.

The same results are obtained.

Example 11

A silver nitrate solution is slowly run into a slurry of the above anion-active resin (particle size 40 mesh) which had been activated with sodium carbonate solution, until 2.8% of silver nitrate, based on the weight of the resin, is absorbed. The time required is about two hours. The thus silvered resin is dried, ground to 200–325 mesh, and compounded as follows.

| | | |
|---|---|---|
| Pale crepe rubber | 50 | 50 |
| Zinc carbonate | 1.25 | 1.25 |
| Sulfur | 1 | 1 |
| Tuads (tetramethylthiuram disulfide) | 0.125 | 0.125 |
| Stabilite (diphenyl ethylene diamine) | 0.25 | 0.25 |
| Paraffin | 0.50 | 0.50 |
| Silver anion-action resin | | 0.50 |

After milling, each of the above formulations is divided into two parts, one set being cured at 155° C. for five minutes and the other being cured at 141° C. for 15 minutes. Each of the four products is pliable and translucent, and is light in color. When tested as above, the products containing the silvered resin exhibit pronounced bacteriostatic activity, whereas the products which contain no silver exhibit no such activity.

Example 12

| | | |
|---|---|---|
| Hycar OR (an acrylonitrile butadiene copolymer) | 100 | 100 |
| Zinc oxide | 5 | 5 |
| Sulfur | 1 | 1 |
| Captax (mercaptobenzothiazol) | 1 | 1 |
| Silver resin of Example 1 | | 5 |
| Stearic acid | 1 | 1 |

After milling, these formulations are cured 30 minutes at 141° C. The products are virtually identical, each being a strong, rugged and pliable elastomer. When tested as above, the product containing silvered resin exhibits a high degree of bacteriostatic activity, whereas the product which contains no silver is nearly inactive in this respect.

Example 13

Examples 3 and 4 are repeated using 10 parts of resin in place of the 3 parts of resin therein employed. Badly scorched, tacky and weak products are obtained.

I claim:

1. A substantially homogeneous, composite elastomer comprising a cured hydrocarbon polymer and an anion-exchange resin containing silver adsorbed thereon, the proportion of said resin being about 2% to 5% of the weight of said elastomer and the proportion of silver in said resin being about 0.5% to 1.5% of the weight of said resin, the size of said resin particles being predominantly between 200 and 325 mesh, said elastomer being further characterized by its ability to release silver ions when contacted with aqueous media.

2. A composition according to claim 1, wherein the resin comprises a urea-guanidine nitrate-formaldehyde resin.

3. A composition according to claim 1, wherein substantially all of the silver present in said resin is present in a chemically combined form with the resin.

4. In the manufacture of a cured elastomer wherein a hydrocarbon elastomer is milled and the resulting composition is subsequently cured at an elevated temperature, the improvement which consists in adding to said elastomer during said milling between 2% and 5% of the weight of said elastomer of an anion-exchange resin containing silver adsorbed thereon, the proportion of silver in said resin being about 0.5% to 1.5% of the weight of said resin, the size of said resin particles being predominantly between 200 and 325 mesh.

5. A process according to claim 4, wherein the resin comprises a urea-guanidine nitrate-formaldehyde resin.

6. A process according to claim 5, wherein substantially all of the silver present in said resin is present in chemically-combined form.

GARNET PHILIP HAM.

REFERENCES CITED

The following references are of record in the file of this patent:

UNITED STATES PATENTS

| Number | Name | Date |
| --- | --- | --- |
| 2,434,190 | Barnes | Jan. 6, 1948 |

OTHER REFERENCES

Schwartz et al.: Ind. & Eng. Chem., pp. 1462–1464, November 1940.

Vanderbilt 1948 Rubber Handbook, p. 99; pub. 1948 by R. T. Vanderbilt Co., N. Y.

Davis and Blake, Chemistry and Technology of Rubber, 1937, p. 294. Reinhold Pub. Corp.